(12) United States Patent
Chung et al.

(10) Patent No.: US 9,263,746 B2
(45) Date of Patent: Feb. 16, 2016

(54) BINDER FOR ELECTRODE OF LITHIUM RECHARGEABLE BATTERY AND ELECTRODE FOR RECHARGEABLE BATTERY COMPRISING THE SAME

(71) Applicant: Samsung SDI Co., Ltd., Yongin-si, Gyeonggi-do (KR)

(72) Inventors: Byungjoo Chung, Yongin-si (KR); Namseon Kim, Daejeon (KR); Kwangshik Choi, Daejeon (KR); Yangsoo Kim, Daejeon (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 127 days.

(21) Appl. No.: 13/956,057

(22) Filed: Jul. 31, 2013

(65) Prior Publication Data

US 2014/0038049 A1    Feb. 6, 2014

Related U.S. Application Data

(63) Continuation-in-part of application No. 13/801,587, filed on Mar. 13, 2013.

(30) Foreign Application Priority Data

Aug. 1, 2012    (KR) .......................... 10-2012-0084510

(51) Int. Cl.
| | |
|---|---|
| *H01M 4/00* | (2006.01) |
| *H01M 4/62* | (2006.01) |
| *H01M 4/133* | (2010.01) |
| *H01M 4/1393* | (2010.01) |
| *H01M 10/052* | (2010.01) |

(52) U.S. Cl.
CPC .............. *H01M 4/622* (2013.01); *H01M 4/133* (2013.01); *H01M 4/1393* (2013.01); *H01M 10/052* (2013.01); *Y02E 60/122* (2013.01)

(58) Field of Classification Search
CPC ............................. H01M 4/622; H01M 10/052
USPC ........................................................ 429/217
See application file for complete search history.

(56) References Cited

U.S. PATENT DOCUMENTS

2012/0189913 A1    7/2012    Wakizaka et al.

FOREIGN PATENT DOCUMENTS

| EP | 1 011 162 A1 | | 6/2000 |
|---|---|---|---|
| JP | 02 008271 | * | 1/1990 |
| JP | 2004-134369 (A) | | 4/2004 |
| JP | 2008-077837 (A) | | 4/2008 |
| JP | 2010-521798 (A) | | 6/2010 |
| KR | 10-2004-0053493 (A) | | 6/2004 |
| KR | 10-2011-0098111 (A) | | 9/2011 |

OTHER PUBLICATIONS

Extended European Search Report dated Oct. 17, 2013 for European Patent Application No. EP 13 178 889.5 which shares priority of Korean Patent Application No. KR 10-2012-0084510 with U.S. Appl. No. 13/801,587, filed Mar. 13, 2013, which is the parent of captioned U.S. CIP U.S. Appl. No. 13/956,057.

\* cited by examiner

*Primary Examiner* — Kuo-Liang Peng
(74) *Attorney, Agent, or Firm* — Knobbe Martens Olson & Bear, LLP

(57) ABSTRACT

In one aspect, a binder for an electrode of a lithium rechargeable battery, which increases adhesion between the electrode and an active material by saving characteristics of two monomers by grafting an acryl group to a vinyl alcohol group, and an electrode for a rechargeable battery comprising the same are provided. The electrode can improve charge and discharge cycle life characteristics of the rechargeable battery.

13 Claims, 4 Drawing Sheets

BINDER FOR ELECTRODE OF LITHIUM RECHARGEABLE BATTERY AND ELECTRODE FOR RECHARGEABLE BATTERY COMPRISING THE SAME

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application is a continuation in part of U.S. patent application Ser. No. 13/801,587, filed on Mar. 13, 2013, and claims priority to and the benefit of Korean Patent Application No. 10-2012-0084510, filed on Aug. 1, 2012, in the Korean Intellectual Property Office, the disclosures of which are incorporated herein by reference in their entireties.

BACKGROUND

1. Field

Embodiments of the present disclosure relate to a binder for an electrode of a lithium rechargeable battery and an electrode for a rechargeable battery comprising the same.

2. Description of the Related Technology

As applications of rechargeable batteries are gradually increasing from small electronic devices to electric automobiles or power storages, there is increasing demand for positive electrode materials for use in rechargeable batteries having various advantageous characteristics, including high safety, extended cycle life, high energy density and high output characteristic.

Development of diverse electrode active materials has been made an area of research. However, there may be a limitation in using known binder systems, such as SBR/CMC in conjunction with new electrode active materials due to low adhesion between the binder and certain electrode active materials. In addition, the known binders may often adversely affect characteristics after repeated charge and discharge cycles. In particular, certain active materials may expand to approximately 300% of their original sizes due to metal characteristics with repeated charge and discharge cycles, such as Si-based active materials, thus, there is a limitation in using existing binders. In addition, charge and discharge characteristics may noticeably degrade when known binders are used.

SUMMARY

Some embodiments provide a binder for an electrode of a lithium rechargeable battery, which can exhibit high adhesion even when used with an electrode active material for a high-capacity battery, thereby providing excellent charge and discharge cycle life characteristics.

Some embodiments provide a binder for an electrode of a lithium rechargeable battery, wherein the binder includes a copolymer of Chemical Formula 1:

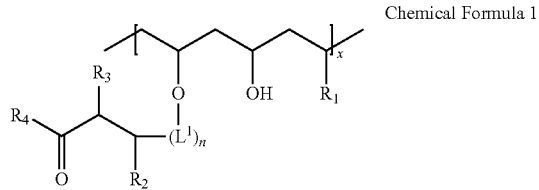

Chemical Formula 1 wherein $L^1$ may be

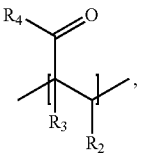

wherein each $R_1$ may be independently OH or $-OR_5$, wherein each $R_2$ may be independently selected from H (hydrogen), a substituted or unsubstituted $C_1$-$C_{10}$ alkyl group, a substituted or unsubstituted styrene group, $-(C(R_6)_2)_q OSi(R_6)_2 OR_6$, $-(C(R_6)_2)_q OSi(R_6)_3$, $-(C(R_6)_2)_q OSi(OR_6)_3$, $-(C(R_6)_2)_q SiR_6(OR_6)_2$, $-(C(R_6)_2)_q Si(R_6)_2 OR_6$, $-(C(R_6)_2)_q Si(R_6)_3$ and $-(C(R_6)_2)_q Si(OR_6)_3$, wherein each $R_3$ may be independently selected from H (hydrogen), a substituted or unsubstituted $C_1$-$C_{10}$ alkyl group, a substituted or unsubstituted styrene group, $-(C(R_6)_2)_q OSiR_6(OR_6)_2$, $-(C(R_6)_2)_q OSi(R_6)_2 OR_6$, $-(C(R_6)_2)_q OSi(R_6)_3$, $-(C(R_6)_2)_q OSi(OR_6)_3$, $-(C(R_6)_2)_q SiR_6(OR_6)_2$, $-(C(R_6)_2)_q Si(R_6)_2 OR_6$, $-(C(R_6)_2)_q Si(R_6)_3$, $-(C(R_6)_2)_q Si(OR_6)_3$ and a compound of Chemical Formula 3:

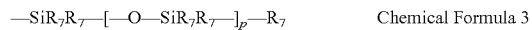

Chemical Formula 3 wherein at least one of $R_2$ and $R_3$ is not H (hydrogen);

wherein each $R_4$ may be independently $-OR_{10}$ or $-NR_{11}R_{12}$;

wherein $R_5$ may be $-(CHR_2CR_3COR_4)_m (CHR_2CHR_3COR_4)_n$;

wherein each $R_6$ may be independently selected from H (hydrogen) or a substituted or unsubstituted $C_1$-$C_{20}$ alkyl group, a $C_2$-$C_{20}$ alkenyl group, a $C_2$-$C_{20}$ alkynyl group, a $C_1$-$C_{16}$ alkyl group, a $C_6$-$C_{20}$ aryl group, and a $C_3$-$C_8$ cycloalkyl group;

wherein each $R_7$ may be independently selected from H (hydrogen), OH, a substituted or unsubstituted $C_1$-$C_{20}$ alkyl group, a $C_2$-$C_{20}$ alkenyl group, a $C_2$-$C_{20}$ alkynyl group, a $C_6$-$C_{20}$ aryl group, and a $C_3$-$C_8$ cycloalkyl group, each optionally substituted with one or more components selected from the group consisting of halogen, amino, mercapto, ether, ester, $C_1$-$C_{20}$ alkoxy, sulfone, nitro, hydroxy, cyclobutene, carbonyl, carboxyl, alkyd, urethane, vinyl, nitrile, and epoxy;

wherein each $R_{10}$ may be independently H (hydrogen), a substituted or unsubstituted $C_1$-$C_{10}$ straight or branched alkyl group, a substituted or unsubstituted $C_2$-$C_{20}$ alkenyl group, $C_3$-$C_8$ cycloalkyl group, a substituted or unsubstituted silane group, a substituted or unsubstituted $C_1$-$C_{20}$ alkylsilane group, or a compound of Chemical Formula 3 as defined above;

wherein each $R_{11}$ and $R_{12}$ may be independently H (hydrogen), a substituted or unsubstituted $C_1$-$C_{10}$ straight or branched alkyl group, a substituted or unsubstituted $C_2$-$C_{20}$ alkenyl group, or a substituted or unsubstituted $C_3$-$C_8$ cycloalkyl group;

wherein x may be an integer between 1 and 5,000, wherein each m may be an integer between 500 and 5,000, wherein each n may be an integer between 500 and 5,000;

wherein each p may be an integer between 500 and 5,000;

wherein each q may be 0, 1, 2, 3, 4, 5, or 6; and wherein $R_5$ may be from 30 to 70 wt % of the molecular mass of the copolymer of Chemical Formula 1.

Some embodiments provide a process for preparing a binder as disclosed and described herein including;

mixing monomer and polyvinyl alcohol;

grafting monomer to polyvinyl alcohol in the presence of an oxidant to provide the copolymer of Chemical Formula 1, wherein the monomer may be an acryl monomer and a carboxylic monomer, where the acryl monomer may be at least one selected from the group consisting of N-methylol acrylamide, methyl(meth)acrylate, butyl(meth)acrylate, ethyl acrylate, 2-ethyl hexyl acrylate, hydroxypropyl (meth)acrylate, styrene, alpha-methyl styrene and (meth)acrylonitrile, and where the carboxylic monomer may be at least one selected from the group consisting of (meth)acrylic acid, itaconic acid, furmaric acid, crotonic acid, maleic acid, monomethyl itaconate, methyl fumarate and monobutyl fumarate, which are used alone or in a combination of two or more of these materials.

Some embodiments provide a binder for an electrode of a lithium rechargeable battery, wherein the binder includes a copolymer of Chemical Formula 5:

Chemical Formula 5

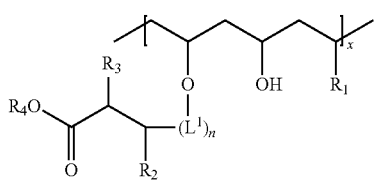

wherein $L^1$ may be

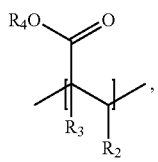

wherein $R_1$ may be OH or $-OR_5$, where $R_5$ may be $-(CHR_2CR_3COOR_4)_m(CHR_2CHR_3COOR_4)$ (m may be an integer between 500 and 5,000), $R_2$ and $R_3$ may be independently H (hydrogen), a substituted or unsubstituted C1-C10 alkyl group, a substituted or unsubstituted styrene group, or $-Si(OR_6)_3$, where $R_6$ may be independently H (hydrogen) or a substituted or unsubstituted C1-C20 alkyl group, a C2-C20 alkenyl group, a C2-C20 alkynyl group, a C1-C16 aliphatic hydrocarbon group, a C6-C20 aryl group, or C3-C8 cycloalkyl group. In some embodiments, m may be an integer between 500 and 2,500. In some embodiments, m may be an integer between 500 and 1,000.

In some embodiments, at least one of $R_2$ and $R_3$ is not H (hydrogen), $R_4$ is H (hydrogen), a substituted or unsubstituted C1-C10 linear or branched alkyl group, a substituted or unsubstituted C2-C20 alkenyl group, a C3-C8 cycloalkyl group, a substituted or unsubstituted silane group, or a substituted or unsubstituted C1-C20 alkylsilane group.

In some embodiments, x may be an integer from 1 to about 5000. In some embodiments, the acryl group ($R_5$) provides 30 to 70 wt % of the molecular mass.

In some embodiments, n may be an integer between 500 and 5,000. In some embodiments, n may be an integer from 1 to about 5,000. In some embodiments, n may be an integer from about 500 and 2,500. In some embodiments, n may be an integer from about 500 and 1,000.

In some embodiments, the copolymer of the of Chemical Formula 1 or Chemical Formula 5 has an average molecular weight of 200,000~500,000.

In some embodiments, the binder further comprises a copolymer of Chemical Formula 6:

Chemical Formula 6

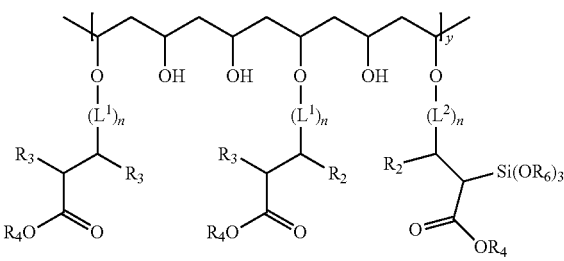

wherein $L^1$ may be

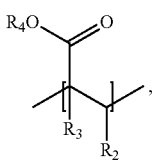

wherein $L^2$ may be

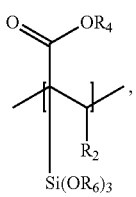

wherein $R_2$ and $R_3$ are each independently H (hydrogen), a substituted or unsubstituted C1-C10 alkyl group, or a substituted or unsubstituted styrene group, provided at least one of $R_2$ and $R_3$ is not H (hydrogen), and $R_4$ is H (hydrogen), a substituted or unsubstituted C1-C10 linear or branched alkyl group, a substituted or unsubstituted C2-C20 alkenyl group, or a substituted or unsubstituted C3-C8 cycloalkyl group. In some embodiments, each $R_7$ is independently C1-C20 alkyl group, a C2-C20 alkenyl group, a C2-C20 alkynyl group, a C6-C20 aryl group, or a C3-C8 cycloalkyl group, each optionally substituted with one or more components selected from the group consisting of halogen, amino, mercapto, ether, ester, C1-C20 alkoxy, sulfone, nitro, hydroxy, cyclobutene, carboxyl, alkyd, urethane, vinyl, and nitrile. In some embodiments, y may be an integer from 1 to about 5000.

Some embodiments provide an electrode for a rechargeable battery using the electrode active material as disclosed and described herein.

As described above, in the binder according to the present invention, an acryl group is grafted to a vinyl alcohol group to improve the characteristics of the binder, such as adhesion. In addition, since the number of cross links is increased, the binder may have a dense structure, so that it can withstand expansion of an electrode active material.

In some embodiments, the binder may have a silane moiety as part of an acryl group, by which a netting property is considerably strengthened by increasing the kinds and lengths of branches, thereby improving adhesion between the electrode and the active material.

Therefore, the rechargeable battery including an electrode employing the binder according to the present embodiments may demonstrate good charge and discharge cycle life characteristics.

Additional embodiments and their advantages are set forth in part in the description which follows and may be learned by practice of the invention.

Some embodiments provide a process for preparing a binder as disclosed and described herein including;

mixing monomer and polyvinyl alcohol;

grafting monomer to polyvinyl alcohol in the presence of an oxidant to provide the copolymer of Chemical Formula 1, wherein the monomer may be an acryl monomer and a carboxylic monomer, where the acryl monomer may be at least one selected from the group consisting of N-methylol acrylamide, methyl(meth)acrylate, butyl(meth)acrylate, ethyl acrylate, 2-ethyl hexyl acrylate, hydroxypropyl (meth)acrylate, styrene, alpha-methyl styrene and (meth)acrylonitrile, and where the carboxylic monomer may be at least one selected from the group consisting of (meth)acrylic acid, itaconic acid, fumaric acid, crotonic acid, maleic acid, monomethyl itaconate, methyl fumarate and monobutyl fumarate, which are used alone or in a combination of two or more of these materials.

Some embodiments provide process for preparing a binder including a copolymer of Chemical Formula 5 comprising:

mixing acryl monomer and polyvinyl alcohol;

grafting acryl monomer to polyvinyl alcohol in the presence of an oxidant, where the acryl monomer may be at least one monomer selected from the group consisting of methyl(meth)acrylate, butyl(meth)acrylate, ethyl acrylate, 2-ethyl hexyl acrylate, hydroxypropyl(meth)acrylate, styrene, alpha-methyl styrene and (meth)acrylonitrile to provide the binder including the copolymer of Chemical Formula 5 wherein $L^1$ may be

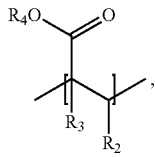

wherein $R_1$ may be OH or $-OR_5$, where $R_5$ may be $-(CHR_2CR_3COOR_4)_m(CHR_2CHR_3COOR_4)$ (m may be an integer between 500 and 5,000), $R_2$ and $R_3$ may each be independently H (hydrogen), a substituted or unsubstituted C1-C10 alkyl group, a substituted or unsubstituted styrene group, or $-Si(OR_6)_3$, where $R_6$ may be independently H (hydrogen) or a substituted or unsubstituted C1-C20 alkyl group, a C2-C20 alkenyl group, a C2-C20 alkynyl group, a C1-C16 alkyl group, a C6-C20 aryl group, C3-C8 cycloalkyl group, wherein at least one of $R_2$ and $R_3$ is not H (hydrogen), $R_4$ may be H (hydrogen), a substituted or unsubstituted C1-C10 linear or branched alkyl group, a substituted or unsubstituted C2-C20 alkenyl group, a C3-C8 cycloalkyl group, a substituted or unsubstituted silane group, or a substituted or unsubstituted C1-C20 alkylsilane group, x may be an integer between 1 and 5,000, and n may be an integer between 500 and 5,000. In some embodiments, the oxidant may be ammonium persulfate.

BRIEF DESCRIPTION OF THE DRAWINGS

The aspects, features and advantages of the present embodiments will be more apparent from the following detailed description in conjunction with the accompanying drawings, in which.

DETAILED DESCRIPTION

Figure 1:
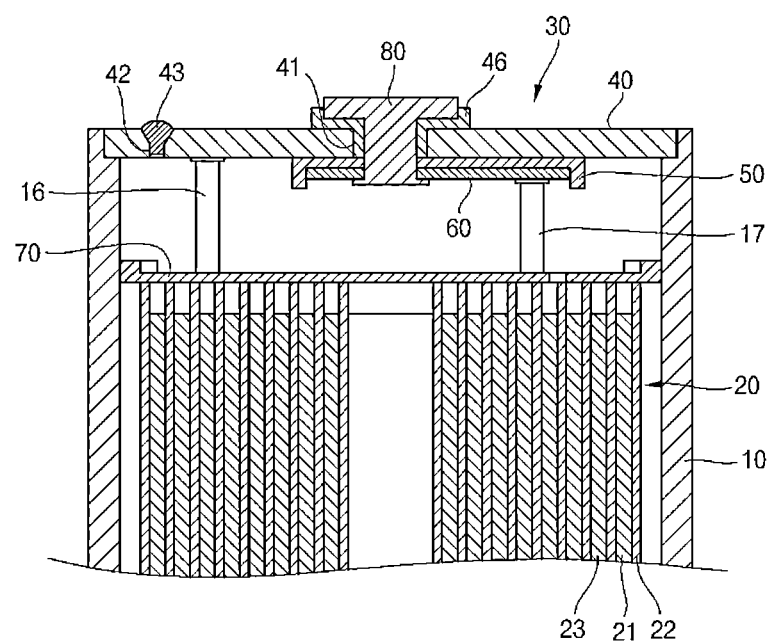
FIG. 1 is a partially cross-sectional view of a lithium rechargeable battery according to an embodiment.
Figure 2:
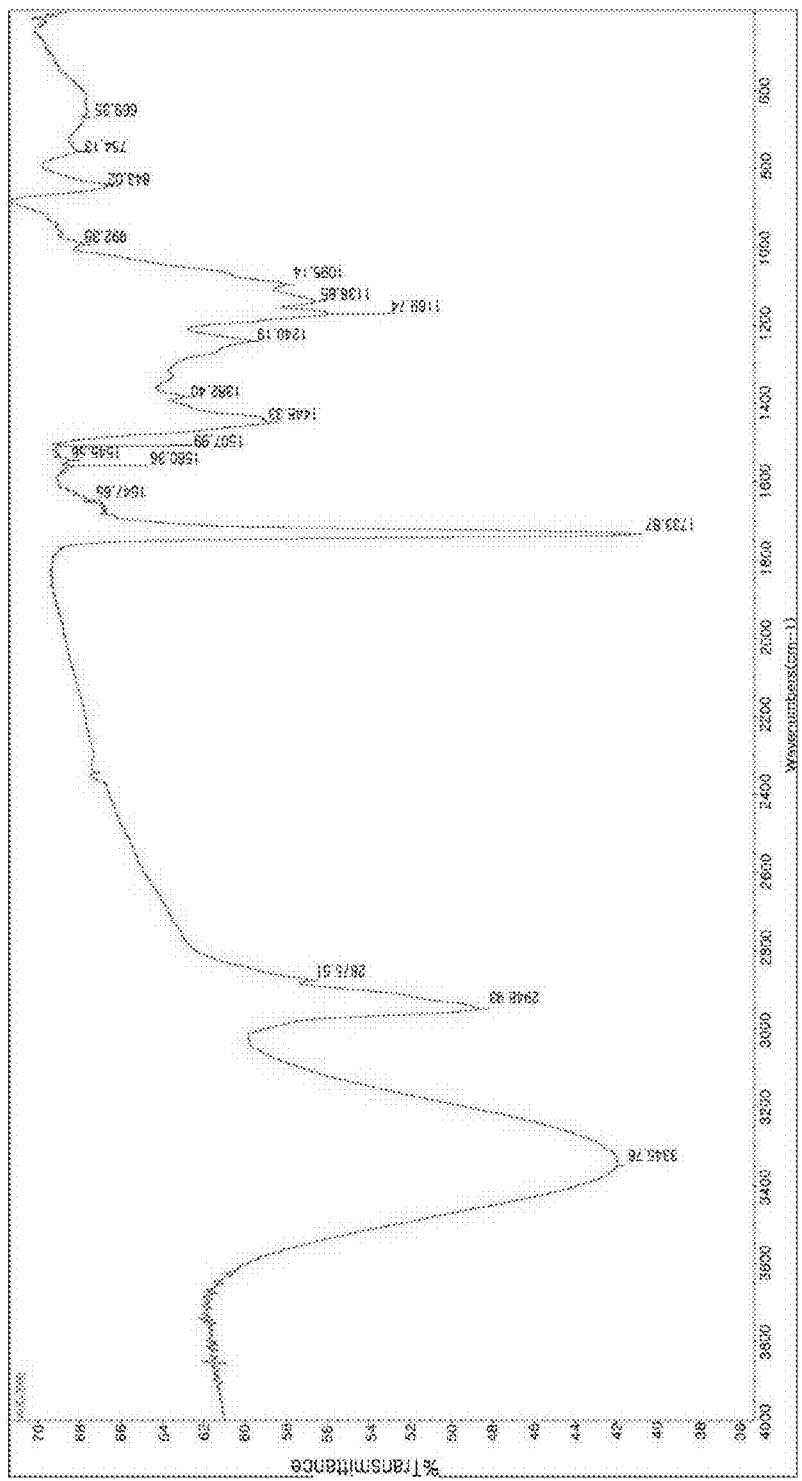
FIG. 2 is an infrared (IR) spectrum of a binder according to Preparation Example 1.
Figure 3:
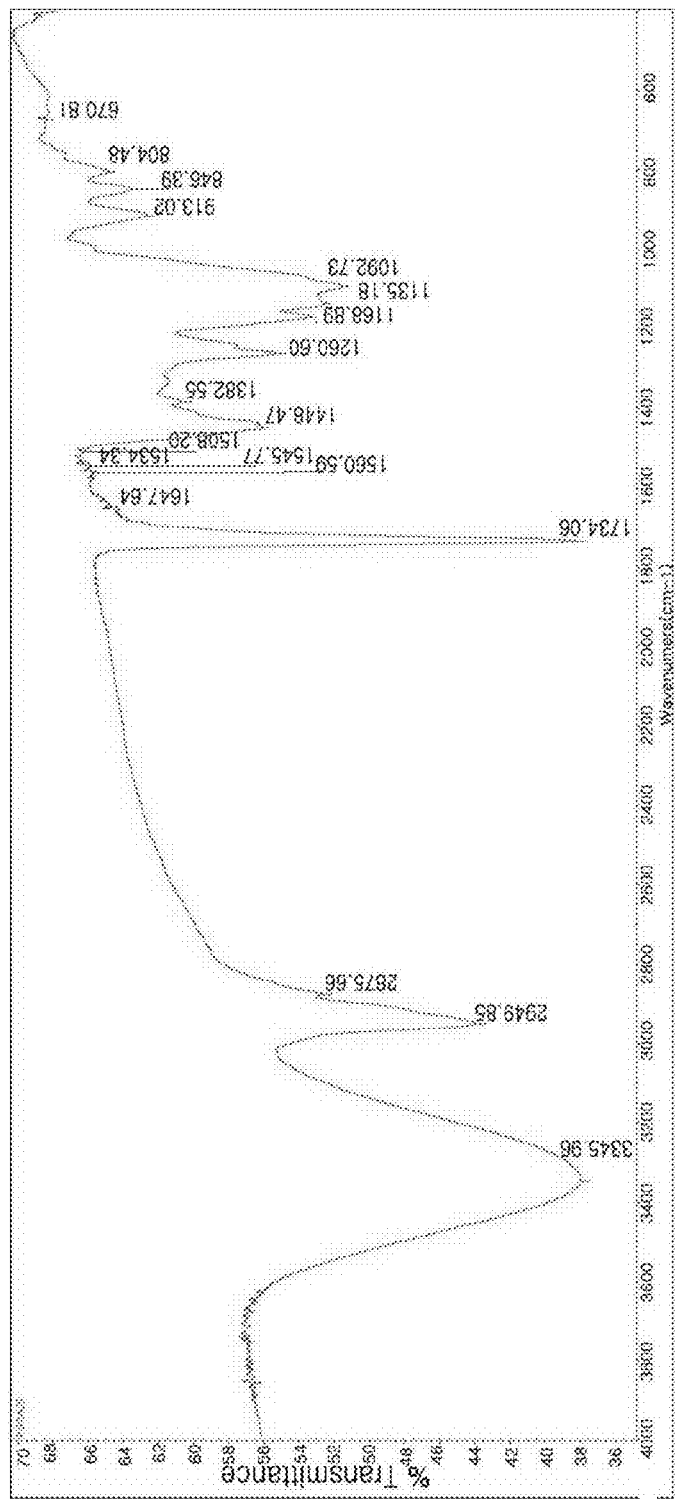
FIG. 3 is an infrared (IR) spectrum of a binder according to Preparation Example 3.
Figure 4:
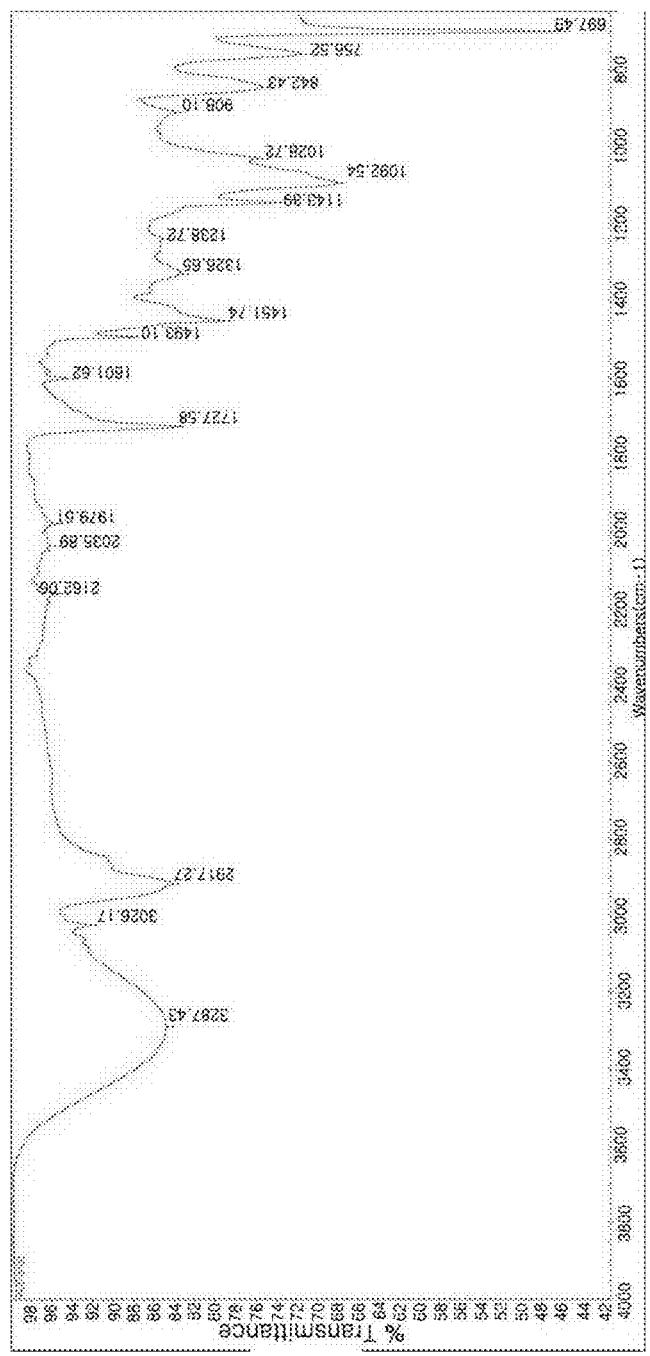
FIG. 4 is an infrared (IR) spectrum of a binder according to Preparation Example 4.

Hereinafter, certain embodiments will be described in detail with reference to the accompanying drawings.

Binder

In some embodiments, the binder for an electrode of a rechargeable battery may include a polymer including Chemical Formula 1:

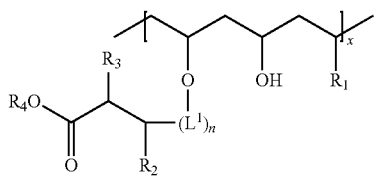
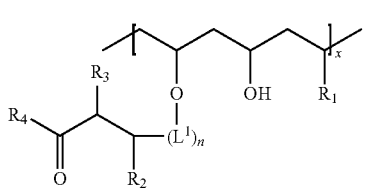

Chemical Formula 1 wherein L¹ may be

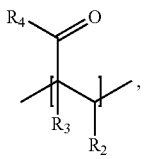

wherein each $R_1$ may be independently OH or $-OR_5$, wherein each $R_2$ may be independently selected from H (hydrogen), a substituted or unsubstituted $C_1$-$C_{10}$ alkyl group, a substituted or unsubstituted styrene group, $-(C(R_6)_2)_qOSi(R_6)_2OR_6$, $-(C(R_6)_2)_qOSi(R_6)_3$, $-(C(R_6)_2)_qOSi(OR_6)_3$, $-(C(R_6)_2)_qSiR_6(OR_6)_2$, $-(C(R_6)_2)_qSi(R_6)_2OR_6$, $-(C(R_6)_2)_qSi(R_6)_3$ and $-(C(R_6)_2)_qSi(OR_6)_3$, wherein each $R_3$ may be independently selected from H (hydrogen), a substituted or unsubstituted $C_1$-$C_{10}$ alkyl group, a substituted or unsubstituted styrene group, $-(C(R_6)_2)_qOSiR_6(OR_6)_2$, $-(C(R_6)_2)_qOSi(R_6)_2OR_6$, $-(C(R_6)_2)_qOSi(R_6)_3$, $-(C(R_6)_2)_qOSi(OR_6)_3$, $-(C(R_6)_2)_qSiR_6(OR_6)_2$, $-(C(R_6)_2)_qSi(R_6)_2OR_6$, $-(C(R_6)_2)_qSi(R_6)_3$, $-(C(R_6)_2)_qSi(OR_6)_3$ and a compound of Chemical Formula 3:

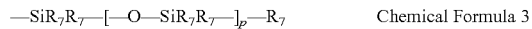   Chemical Formula 3 wherein at least one of $R_2$ and $R_3$ is not H (hydrogen);

wherein each $R_4$ may be independently $-OR_{10}$ or $-NR_{11}R_{12}$;

wherein $R_5$ may be $-(CHR_2CR_3COR_4)_m(CHR_2CHR_3COR_4)$;

wherein each $R_6$ may be independently selected from H (hydrogen) or a substituted or unsubstituted $C_1$-$C_{20}$ alkyl group, a $C_2$-$C_{20}$ alkenyl group, a $C_2$-$C_{20}$ alkynyl group, a $C_1$-$C_{16}$ alkyl group, a $C_6$-$C_{20}$ aryl group, and a $C_3$-$C_8$ cycloalkyl group;

wherein each $R_7$ may be independently selected from H (hydrogen), OH, a substituted or unsubstituted $C_1$-$C_{20}$ alkyl group, a $C_2$-$C_{20}$ alkenyl group, a $C_2$-$C_{20}$ alkynyl group, a $C_6$-$C_{20}$ aryl group, and a $C_3$-$C_8$ cycloalkyl group, each optionally substituted with one or more components selected from the group consisting of halogen, amino, mercapto, ether, ester, $C_1$-$C_{20}$ alkoxy, sulfone, nitro, hydroxy, cyclobutene, carbonyl, carboxyl, alkyd, urethane, vinyl, nitrile, and epoxy;

wherein each $R_{10}$ may be independently H (hydrogen), a substituted or unsubstituted $C_1$-$C_{10}$ straight or branched alkyl group, a substituted or unsubstituted $C_2$-$C_{20}$ alkenyl group, $C_3$-$C_8$ cycloalkyl group, a substituted or unsubstituted silane group, a substituted or unsubstituted $C_1$-$C_{20}$ alkylsilane group, or a compound of Chemical Formula 3 as defined above;

wherein each $R_{11}$ and $R_{12}$ may be independently H (hydrogen), a substituted or unsubstituted $C_1$-$C_{10}$ straight or branched alkyl group, a substituted or unsubstituted $C_2$-$C_{20}$ alkenyl group, or a substituted or unsubstituted $C_3$-$C_8$ cycloalkyl group;

wherein x may be an integer between 1 and 5,000,
wherein each m may be an integer between 500 and 5,000,
wherein each n may be an integer between 500 and 5,000;
wherein each p may be an integer between 500 and 5,000;
wherein each q may be 0, 1, 2, 3, 4, 5, or 6; and
wherein $R_5$ may be from 30 to 70 wt % of the molecular mass of the copolymer of Chemical Formula 1. In some embodiments, each q may be 0. In some embodiments, each q may be 1. In some embodiments, each q may be 2. In some embodiments, each q may be 0. In some embodiments, each q may be 1. In some embodiments, each q may be 2.

In some embodiments, each $R_3$ may be Chemical Formula 3:

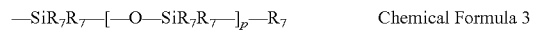   Chemical Formula 3 wherein each $R_7$ may be independently H (hydrogen), OH, a substituted or unsubstituted $C_1$-$C_{20}$ alkyl group, a $C_2$-$C_{20}$ alkenyl group, a $C_2$-$C_{20}$ alkynyl group, a $C_6$-$C_{20}$ aryl group, or a $C_3$-$C_8$ cycloalkyl group, each optionally substituted with one or more components selected from the group consisting of halogen, amino, mercapto, ether, ester, $C_1$-$C_{20}$ alkoxy, sulfone, nitro, hydroxy, cyclobutene, carbonyl, carboxyl, alkyd, urethane, vinyl, nitrile, and epoxy;

each $R_4$ may be $-OR_{10}$; and each $R_{10}$ may be a compound of Chemical Formula 3.

In some embodiments, the binder may be made by a process including:

grafting monomer to polyvinyl alcohol, wherein the monomer may be an acryl monomer and a carboxylic monomer, where the acryl monomer may be at least one selected from the group consisting of N-methylol acrylamide, methyl(meth)acrylate, butyl(meth)acrylate, ethyl acrylate, 2-ethyl hexyl acrylate, hydroxypropyl (meth)acrylate, styrene, alpha-methyl styrene and (meth)acrylonitrile; and where the carboxylic monomer may be at least one selected from the group consisting of (meth)acrylic acid, itaconic acid, fumaric acid, crotonic acid, maleic acid, monomethyl itaconate, methyl fumarate and monobutyl fumarate, which are used alone or in a combination of two or more of these materials.

In some embodiments, the binder further includes a copolymer of Chemical Formula 2:

Chemical Formula 2

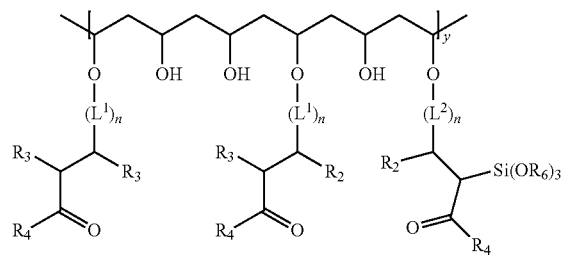

wherein L¹ may be

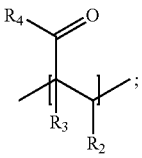

wherein $L^2$ may be

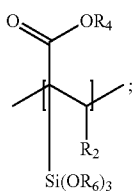

y may be an integer from 1 to about 5000;

wherein $R_2$ and $R_3$ may each independently be H (hydrogen), a substituted or unsubstituted $C_1$-$C_{10}$ alkyl group, or a substituted or unsubstituted styrene group, provided at least one of $R_2$ and $R_3$ is not H (hydrogen), and $R_4$ is H (hydrogen), a substituted or unsubstituted $C_1$-$C_{10}$ linear or branched alkyl group, a substituted or unsubstituted $C_2$-$C_{20}$ alkenyl group, or a substituted or unsubstituted $C_3$-$C_8$ cycloalkyl group.

In some embodiments, each $R_2$ may be independently selected from H (hydrogen), a substituted or unsubstituted $C_1$-$C_{10}$ alkyl group, a substituted or unsubstituted styrene group, and —Si(OR$_6$)$_3$. In some embodiments, each $R_3$ may be independently selected from H (hydrogen), a substituted or unsubstituted $C_1$-$C_{10}$ alkyl group, a substituted or unsubstituted styrene group, —Si(OR$_6$)$_3$ and a compound of Chemical Formula 3:

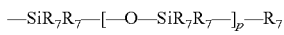 Chemical Formula 3

In some embodiments, each $R_{11}$ and $R_{12}$ may be independently H (hydrogen), a substituted or unsubstituted $C_1$-$C_{10}$ straight or branched alkyl group, a substituted or unsubstituted $C_2$-$C_{20}$ alkenyl group, or $C_3$-$C_8$ cycloalkyl group.

In some embodiments, the binder for an electrode of a rechargeable battery may include a polymer including Chemical Formula 5:

Chemical Formula 5

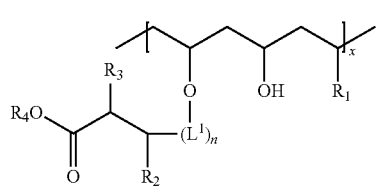

wherein $L^1$ may be

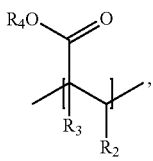

wherein $R_1$ may be OH or —OR$_5$, where $R_5$ may be —(CHR$_2$CR$_3$COOR$_4$)$_m$(CHR$_2$CHR$_3$COOR$_4$) (m may be an integer between 500 and 5,000), $R_2$ and $R_3$ may be independently H (hydrogen), a substituted or unsubstituted C1-C10 alkyl group, a substituted or unsubstituted styrene group, or —Si(OR$_6$)$_3$, where $R_6$ is independently H or a substituted or unsubstituted C1-C20 alkyl group, a C2-C20 alkenyl group, a C2-C20 alkynyl group, a C1-C16 aliphatic hydrocarbon group, a C6-C20 aryl group, or C3-C8 cycloalkyl group. In some embodiments, m may be an integer between 500 and 2,500. In some embodiments, m may be an integer between 500 and 1,000.

In some embodiments, at least one of $R_2$ and In some embodiments, at is not H (hydrogen), $R_4$ is H (hydrogen), a substituted or unsubstituted C1-C10 linear or branched alkyl group, a substituted or unsubstituted C2-C20 alkenyl group, a C3-C8 cycloalkyl group, a substituted or unsubstituted silane group, or a substituted or unsubstituted C1-C20 alkylsilane group.

In some embodiments, x may be an integer from 1 to about 5000. In some embodiments, the acryl group ( ) provides 30 to 70 wt % of the molecular mass.

In some embodiments, n may be an integer between 500 and 5,000. In some embodiments, n may be an integer from 1 to about 5,000. In some embodiments, n may be an integer from about 500 and 2,500. In some embodiments, n may be an integer from about 500 and 1,000.

In some embodiments, the polymer including Chemical Formula 1 may include a polymer of Chemical Formula 2:

Chemical Formula 2

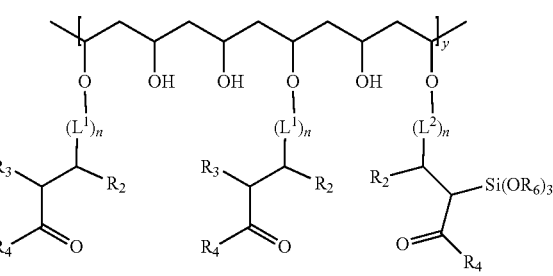

wherein $L^1$ may be

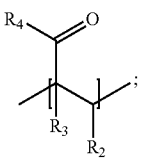

wherein $L^2$ may be

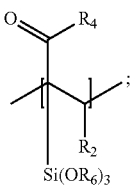

y may be an integer from 1 to about 5000; and wherein $R_2$ and $R_3$ may each independently be H (hydrogen), a substituted or unsubstituted $C_1$-$C_{10}$ alkyl group, or a substituted or unsubstituted styrene group, provided at least one of $R_2$ and $R_3$ is not H (hydrogen), and $R_4$ is H (hydrogen), a substituted or unsubstituted $C_1$-$C_{10}$ linear or branched alkyl group, a substituted or unsubstituted C2-C20 alkenyl group, or a substituted or unsubstituted $C_3$-$C_8$ cycloalkyl group.

In some embodiments, the polymer including Chemical Formula 5 may include a polymer of Chemical Formula 6:

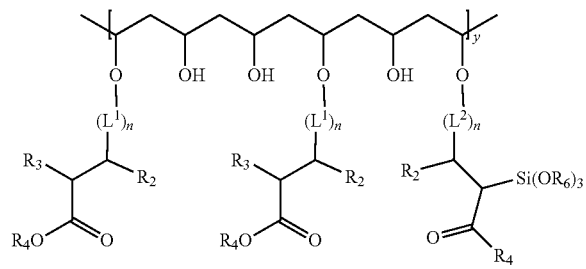

Chemical Formula 6 wherein $L^1$ may be

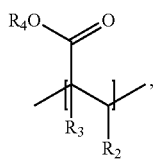

wherein $L^2$ may be

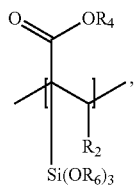

wherein $R_2$ and $R_3$ may be independently H (hydrogen), a substituted or unsubstituted C1-C10 alkyl group, or a substituted or unsubstituted styrene group, provided at least one of $R_2$ and $R_3$ is not H (hydrogen), and $R_4$ may be H (hydrogen), a substituted or unsubstituted C1-C10 linear or branched alkyl group, a substituted or unsubstituted C2-C20 alkenyl group, or a substituted or unsubstituted C3-C8 cycloalkyl group.

In some embodiments, a silane group having a hydrolysis group may be used in the preparation of the polymer to afford a moiety within the polymer as specified by Chemical Formula 3:

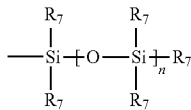

Chemical Formula 3 wherein each $R_7$ is independently H (hydrogen), OH, a substituted or unsubstituted C1-C20 alkyl group, a C2-C20 alkenyl group, a C2-C20 alkynyl group, a C1-C16 aliphatic hydrocarbon group, a C6-C20 aryl group, or a C3-C8 cycloalkyl group, and $R_7$ may have at least one functional group selected from the group consisting of halogen, amino, mercapto, ether, ester, C1-C20 alkoxy, sulfone, nitro, hydroxy, cyclobutene, carbonyl, carboxyl, alkyd, urethane, vinyl, nitrile, and epoxy.

In some embodiments, the copolymer including Chemical Formula 1 or Chemical Formula 5 has a weight average molecular weight of 200,000 to 500,000. If the weight average molecular weight of the copolymer including Chemical Formula 1 or Chemical Formula 5 is less than 200,000, the effects of increased adhesion and improving charge and discharge cycle life characteristic are not noticeable. If the weight average molecular weight of the copolymer of Chemical Formula 1 or Chemical Formula 5 is greater than 500,000, gelation may be likely to occur during polymerization.

In some embodiments, in the copolymer including Chemical Formula 1 or Chemical Formula 5, n and y may have a ratio of 1:2.3 to 2.3:1. The acryl group may be effectively grafted to the vinyl alcohol group within the preceeding range.

In some embodiments, the binder may be prepared by grafting an acryl monomer to polyvinyl alcohol having many hydroxyl groups. In some embodiments, the monomer used in grafting may include at least one component selected from the group consisting of methyl(meth)acrylate, and butyl (meth)acrylate, ethyl acrylate, 2-ethyl hexyl acrylate, hydroxypropyl(meth)acrylate, styrene, alpha-methyl styrene, and at least one carboxylic monomer selected from the group consisting of (meth)acrylic acid, itaconic acid, fumaric acid, crotonic acid, maleic acid, monomethyl itaconate, methyl fumarate and monobutyl fumarate, which are used alone or a combination of two or more of these materials. In addition, in the present invention, examples of the comonomer copolymerizable with the acryl monomer may include not only carboxylic monomer, (meth)acrylamide, diacetone(meth)acrylamide, N-methylol(meth)acrylamide, N-isobutoxy (meth)acrylamide, acrylonitrile and methacrylonitrile.

In some embodiments, the monomer may be present in an amount of 70 to 98 wt % based on the total weight of the monomers used, and the grafted acryl group has a glass transition temperature (Tg) in a range of 0 to 70° C.

In some embodiments, the polymerization for preparing the binder may be initiated by heat or a redox initiating process. In order to increase the grafting efficiency, a redox initiating process is preferred. In some embodiments, a general free-radical initiator such as hydroperoxide, benzoyl peroxide, t-butyl hydroperoxide, ammonium or alkali persulfate may be used as the initiator, and a low-level ionized salt such as sulfite, hydrogen sulfite, iron, copper or cobalt, an organic amine such as N,N,N,N'-tetramethylethylenediamine or aniline, and a reducing sugar such as aldose or ketose may be used as a reducing agent. In some embodiments, ceric ammonium nitrate or a transition metal such as nickel or copper may also be used as an additional component. In some embodiments, the initiator may be generally present in an amount of 0.05 to 3.0 wt % based on the total weight of monomer used.

In some embodiments, the binder may use a cross-linking agent to induce cross linking between grafted acryl chains so as to withstand expansion of an electrode active material. Examples of usable cross-linking agents may include diethylene glycol diacrylate, triethylene glycol triacrylate, tripropylene triacrylate, 1,6-hexanedioldiacrylate, trimethylpropane triacrylate, divinyl benzene, and diallylphthalate, and may be used in an amount of 0.2 to 5 wt % based on the total weight of the monomer used.

In some embodiments, the binder according to the present invention may introduce a silane group in order to improve adhesion between an electrode and an active material. In some embodiments, the adhesion of the binder may be adversely affected due to volumetric expansion during charge and discharge cycles, thereby degrading the charge and discharge cycle life characteristics in a case of a Si-based negative electrode active material. Binding between the binder and the active material is induced, thereby improving the cycle life characteristic. In some embodiments, the cycle life characteristic of the battery can be improved by a covalent bond between an OH functional group on a surface of the Si-based negative electrode active material and a silanol functional group grafted to the binder. In some embodiments, the binder having a siloxane bond may be prepared using silane having an ethylenically unsaturated monomer capable of binding with the acryl monomer and silane having a hydrolysis group in order to synthesize the silane grafted binder. Examples of the silane having the ethylenically unsaturated monomer may include vinyltrimethoxy silane, vinyltriethoxy silane, 3-(meth)acryloxypropyl trimethoxy silane, 3-(meth)acryloxypropyl triethoxy silane, 3-acryloxypropyl trimethoxy silane, and 3-acryloxypropyl triethoxy silane. Specific examples of the silane having a hydrolysis group may include at least one selected from the group consisting of methyltrimethoxy silane, phenyltrimethoxysilane, methyltriethoxysilane, phenyltriethoxysilane, isobutyltrimethoxysilane, and dimethyldimethoxysilane. In some embodiments, the silane may be contained in an amount of 5-30 wt % based on the total weight of the acryl monomer used.

In some embodiments, a surfactant may be used in order to attain stability of the binder. Examples of suitable surfactants may include an anionic surfactant, a nonionic surfactant and a combination thereof. Examples of the anionic surfactant used in the present invention may include aliphatic rosin, salts of naphthenic acid, naphthalene sulfonic acid having a low molecular weight, a condensed product of formaldehyde, a carboxylic polymer, a copolymer appropriately balanced in hydrophilicity and oleophilicity, alkali metal or ammonium alkyl sulfate, alkylsulfonic acid, alkyl phosphonic acid, fatty acid, oxyethylated alkylphenol sulfate, phosphate, and a reactive anionic emulsifier having an unsaturated double bond polymerizable with a polymer chain. Examples of the nonionic surfactant used in the present invention may include alkylphenol ethoxylate, polyoxyethylenic alkylalcohol, amine polyglycol condensate, modified polyethoxy additive, long chain carboxylic ester, modified alkylaryl ether, alkyl polyether alcohol, and a reactive nonionic emulsifier having an unsaturated double bond polymerizable with a polymer chain. In some embodiments, the anionic surfactants and the nonionic surfactants may be used alone or combinations of two or more of the surfactants listed herein. For example, the reactive emulsifier may be more preferably used and may be contained in an amount of 0.1 to 3 wt % based on the weight of the polymerized monomer.

In some embodiments, the binder may also be used in combination with the conventional binder such as styrene butadiene rubber (SBR) or carboxylmethylcellulose (CMC). In some embodiments, the binder may be contained in an amount of 1 wt % or greater. In some embodiments, the binder may further include additional functional additives such as epoxy resin, oxirand triazines, polyvalent metal salts, amino formaldehyde resins or isocyanates, to induce cross-linkage between the carboxyl functional group or hydroxy functional group in the binder, thereby increasing bonds between polymer chains.

Other Additives

In some embodiments, a composition of the binder may further include additives in addition to the soluble polymer binder, in order to improve the performance of further characteristics.

Examples of the additives may include a dispersing agent, a thickening agent, a conductive agent, a filler and so on.

In some embodiments, the respective additives may be used after being pre-mixed with a binder composition for forming the electrode when a slurry for forming an electrode is prepared, or may be independently used after being separately prepared.

Components of the additives to be used are determined by the active material and binder components, or the additives may not be used.

In some embodiments, the content of the additive may vary according to the kind of the active material, the components of the binder and the kind of the additive used. In some embodiments, the additive may be preferably used in an amount of 0.1 to 10 wt % based on the weight of the binder composition, excluding a solvent. If the content of the additive is less than 0.1 wt %, the effect of the additive used is not sufficient. If the content of the additive is greater than 10 wt %, a proportion of the content of the binder to that of the binder composition for forming a negative electrode is reduced, so that it is difficult to attain desired characteristics.

In some embodiments, the dispersing agent may be selected among materials of improving dispersibility of the positive or negative electrode active materials and the conductive agent in the slurry to then be used. In some embodiments, the dispersing agent may be selected from the cationic, anionic, or nonionic dispersing agents to then be used. In some embodiments, the dispersing agent may be at least one selected among compounds having in their lipophilic parts a C5-C20 hydrocarbon, an acryl oligomer, an ethylene oxide and propylene oxide oligomer, an ethylene oxide and propylene oxide oligomer, and a urethane oligomer.

In some embodiments, a thickening agent may be added when the viscosity of the slurry is low, thereby facilitating a coating process of the slurry on a current collector. Examples of the thickening agent may include at least one component selected from the group consisting of carboxymethyl cellulose, carboxyethyl cellulose, ethyl cellulose, hydroxymethyl cellulose, hydroxyethyl cellulose, hydroxypropyl cellulose, and polyvinyl alcohol.

However, the dispersing agent and the thickening agent are preferably used in small amounts only when necessary.

In some embodiments, the conductive agent may be used to further improve a conductive path of an electrode. In some embodiments, the conductive agent may be used to impart conductivity to the electrode and any electronic conducting material that does not induce a chemical change in batteries may be used. Examples of the conductive agent may include at least one conductive material, such as natural graphite, artificial graphite, carbon black, acetylene black, ketchen black, carbon fiber, and the like, and metal powder, such as copper (Cu), nickel (Ni), aluminum (Al), silver (Ag), and the like.

The filler is a supplementary ingredient to inhibit electrode expansion by improving the strength of the binder, and examples thereof may include at least one fibrous material, such as a glass fiber, a carbon fiber or a metal fiber.

Electrode

In some embodiments, the electrode may include an electrode active material and the binder as disclosed and described herein. In some embodiments, the electrode may be formed by coating an electrode slurry including the electrode active material, the binder and a solvent mixed therein, and, if necessary, further including a conductive agent, on an electrode current collector to a predetermined thickness, drying and compressing the same.

In some embodiments, the binder may be preferably used in preparing a negative electrode.

In some embodiments, any negative electrode active material that is capable of intercalating and deintercalating lithium ions can be used as the negative electrode active material used in preparing the negative electrode.

In some embodiments, the negative electrode active material may include one or more material selected from the group consisting of compounds that can reversibly intercalate and deintercalate lithium ions, metals being capable of alloying with lithium, and combinations thereof. In some embodiments, the materials that can reversibly intercalate and deintercalate lithium ions may include at least one selected from the group consisting of artificial graphite, natural graphite, graphitized carbon fiber, graphitized mesocarbon microbeads, fullerene, amorphous carbon, and so on.

In some embodiments, the amorphous carbon may be a hard carbon, cokes, or a soft carbon obtained by firing at a temperature of 1500° C. or below, such as mesocarbon microbead (MCMB) or mesophase pitch-based carbon fiber (MPCF). In addition, examples of suitable metals being capable of alloying with lithium include at least one metal selected from the group consisting of aluminum (Al), silicon (Si), tin (Sn), lead (Pb), zinc (Zn), bismuth (Bi), indium (In), magnesium (Mg), gallium (Ga), cadmium (Cd), and germanium (Ge), which may be used alone or in combinations. In addition, the metals may be used in combinations with carbonaceous materials.

In some embodiments, the negative electrode active material may be preferably a Si-based negative electrode active material. In some embodiments, the Si-based negative electrode active material may ensure a high capacity but may adversely affect the adhesion of the binder due to excessive expansion during charge and discharge cycles, thereby lowering cycle life characteristics of battery. However, the disadvantage can be overcome by using the binder according to the present embodiments. In some embodiments, the binder may provide a rechargeable battery ensuring a high capacity and excellent cycle life characteristics.

In some embodiments, the Si-based negative electrode active material may include one or more elements based on $SiO_x$ ($0 \leq x < 2$) or Si, the one or more elements selected from the group consisting of Group 2A, 3A and 4A elements and transition metals. In some embodiments, the elements may be preferably at least one of Sn, Al, Pb, In, Ni, Co, Ag, Mn, Cu, Ge, Cr, Ti and Fe, more preferably at least one of Ni and Ti, and most preferably Ni and Ti.

In some embodiments, the Si-based metal alloy including Ni and Ti may be preferably contained in an amount of 55 to 85 at % based on the total weight of the metal alloy because the Si-based metal alloy may be used as a Si-based active material and provide sufficiently high charge and discharge capacity when it is used within this range.

In some embodiments, the metal elements are preferably contained in a ratio of 16:17:17 at % when the Si metal alloy is a Si:Ni:Ti alloy. Within this range, excellent capacity and cycle life characteristics are demonstrated.

The metal alloy may be prepared by well known processes in the related art, including, for example, melting spinning, atomizing, mechanically alloying, and so on.

Non-limiting examples of the negative electrode current collector may include a punching metal, an X-punching metal, gold foil, a metal foam, a net metal fiber sinter, a nickel foil, a copper foil, and so on.

In some embodiments, compounds that can reversibly intercalate and deintercalate lithium ions, which are referred to as lithiated intercalation compounds, may be used as the positive electrode active material for forming the positive electrode according to the present invention. In some embodiments, the lithiated intercalation compound may be at least one composite oxide of a metal selected from cobalt (Co), nickel (Ni) and a combination thereof and lithium. In some embodiments, the lithiated intercalation compound may include a compound represented by the following Chemical Formulas:

$Li_aA_{1-b}X_bD^1_2$ ($0.90 \leq a \leq 1.8$, $0 \leq b \leq 0.5$);
$Li_aE_{1-b}X_bO_{2-c}D^1_c$ ($0.90 \leq a \leq 1.8$, $0 \leq b \leq 0.5$, $0 \leq c \leq 0.05$);
$LiE_{2-b}X_bD^1_4$ ($0 \leq b \leq 0.5$); $LiE_{2-b}X_bO_{4-c}D^1_c$ ($0 \leq b \leq 0.5$, $0 \leq c \leq 0.05$);
$Li_aNi_{1-b-c}Co_bX_cD_\alpha$ ($0.90 \leq a \leq 1.8$, $0 \leq b \leq 0.5$, $0 \leq c \leq 0.05$, $0 \leq \alpha \leq 2$);
$Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$);
$Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq a \leq 2$);
$Li_aNi_{1-b-c}Mn_bX_cD^1_\alpha$ ($0.90 \leq a \leq 1.8$, $0 \leq b \leq 0.5$, $0 \leq c \leq 0.05$, $0 \leq \alpha \leq 2$);
$Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$);
$Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$);
$Li_aNi_bE_cG_dO_2$ ($0.90 \leq a \leq 1.8$, $0 \leq b \leq 0.9$, $0 \leq c \leq 0.5$, $0.001 \leq d \leq 0.1$);
$Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$);
$Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$);
$Li_aMnG_bO_2$ ($0.90 \leq a \leq 1.8$, $0.001 \leq b \leq 0.1$);
$Li_aMn_2G_bO_2$ ($0.90 \leq a \leq 1.8$, $0.001 \leq b \leq 0.1$);
$QO_2$, $QS_2$; $LiQS_2$; $V_2O_5$, $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$ In the above formulae, A is selected from the group consisting of Ni, Co, Mn, and combinations thereof; X is selected from the group consisting of Al, Ni, Co, Mn, Cr, Fe, Mg, Sr, V, a rare earth element, and combinations thereof; $D^1$ is selected from the group consisting of O (oxygen), F (fluorine), S (sulfur), P (phosphorus), and combinations thereof; E is selected from the group consisting of Co, Mn, and combinations thereof; T is selected from the group consisting of F (fluorine), S (sulfur), P (phosphorus), and combinations thereof; G is selected from the group consisting of Al, Cr, Mn, Fe, Mg, La, Ce, Sr, V, and combinations thereof; Q is selected from the group consisting of Ti, Mo, Mn, and combinations thereof; Z is selected from the group consisting of Cr, V, Fe, Sc, Y, and combinations thereof; and J is selected from the group consisting of V, Cr, Mn, Co, Ni, Cu, and combinations thereof.

In some embodiments, the compound may have a coating layer on the surface, or may be mixed with another compound having a coating layer. In some embodiments, the coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. In some embodiments, the compound for the coating layer may be amorphous or crystalline. In some embodiments, the coating element included in the coating layer may include Mg, Al, Co, K, Na, Ca, Si, Ti, V, Sn, Ge, Ga, B, As, Zr, or a mixtures thereof. In some embodiments, the coating layer may be disposed with a method having no adverse influence on properties of a positive active material. For example, the method may include any coating method such as spray coating, dipping, and the like, but is not illustrated in more detail since it is well-known to those of ordinary skill in the art.

Unless otherwise indicated, the term "substituted," refers to a group in which, one, or more than one of the hydrogen atoms has been replaced with one or more group(s) individually and independently selected from: alkyl, alkenyl, cycloalkenyl, alkynyl, heteroalkyl, haloalkyl, cycloalkyl, aryl, alkenylO—, arylO—, alkenylO—, cycloalkylC(=O)—, arylC(=O)—, arylC(=O)NH—, arylNHC(=O)—, aryl(CH$_2$)$_{0-3}$O(CH$_2$)$_{0-3}$—, HO(CH$_2$)$_{1-3}$NH—, HO(CH$_2$)$_{1-3}$O—, HO(CH$_2$)$_{1-3}$—, HO(CH$_2$)$_{1-3}$O(CH$_2$)$_{1-3}$—, —C(=O)NHNH$_2$, heteroaryl, hydroxy, alkoxy, mercapto, cyano, halo, oxo, O-carbamyl, N-carbamyl, O-thiocarbamyl, N-thiocarbamyl, C-amido, N-amido, S-sulfonamido, N-sulfonamido, C-carboxy, O-carboxy, isocyanato, thiocyanato, isothiocyanato, nitro, trihalomethanesulfonyl, and amino.

The term "O-carboxy" refers to the group consisting of formula RC(=O)O—, covalently bonded to the parent molecule through an —O— linkage.

The term "C-carboxy" refers to the group consisting of formula —C(=O)OR, covalently bonded to the parent molecule through a —C— linkage.

The substituent "R" appearing by itself and without a number designation refers to a substituent selected from alkyl, cycloalkyl, aryl, and heteroaryl (bonded through a ring carbon).

The term "isocyanato" refers to the group consisting of formula —NCO, covalently bonded to the parent molecule through a —N— linkage.

The term "thiocyanato" refers to the group consisting of formula —CNS, covalently bonded to the parent molecule through a —C— linkage.

The term "isothiocyanato" refers to the group consisting of formula —NCS, covalently bonded to the parent molecule through a —N— linkage.

The term "sulfonyl" refers to the group consisting of formula —S(=O)—R, covalently bonded to the parent molecule through a —S— linkage.

The term "sulfone" refers to the group consisting of formula —S(=O)$_2$—R, covalently bonded to the parent molecule through a —S— linkage.

The term "S-sulfonamido" refers to the group consisting of formula —S(=O)$_2$NR, covalently bonded to the parent molecule through a —S— linkage.

The term "N-sulfonamido" refers to the group consisting of formula RS(=O)$_2$NH—, covalently bonded to the parent molecule through a —N— linkage.

The term "O-carbamyl" refers to the group consisting of formula —OC(=O)—NR, covalently bonded to the parent molecule through a —O— linkage.

The term "N-carbamyl" refers to the group consisting of formula ROC(=O)NH—, covalently bonded to the parent molecule through a —N— linkage.

The term "O-thiocarbamyl" refers to the group consisting of formula —OC(=S)—NR, covalently bonded to the parent molecule through a —O— linkage.

The term "N-thiocarbamyl" refers to the group consisting of formula ROC(=S)NH—, covalently bonded to the parent molecule through a —N— linkage.

The term "C-amido" refers to the group consisting of formula —C(=O)—NR$_2$, covalently bonded to the parent molecule through a —C— linkage.

The term "N-amido" refers to the group consisting of formula RC(=O)NH—, covalently bonded to the parent molecule through a —N— linkage.

The term "oxo" refers to the group consisting of formula =O.

The term "amide" refers to a chemical moiety with formula —(R)$_n$—C(=O)NHR' or —(R)$_n$—NHC(=O)R', covalently bonded to the parent molecule through a —C— or —N— linkage, where R is selected from alkyl, cycloalkyl, aryl, and heteroaryl (bonded through a ring carbon), where n is 0 or 1 and R' is selected from hydrogen, alkyl, cycloalkyl, aryl, and heteroaryl (bonded through a ring carbon).

The term "amino" refers to a chemical moiety with formula —NHR'R", covalently bonded to the parent molecule through a —N— linkage, where R' and R" are each independently selected from hydrogen, alkyl, cycloalkyl, aryl, heteroaryl (bonded through a ring carbon) and heteroalicyclic (bonded through a ring carbon).

As used herein, the term "ester" refers to the group consisting of formula —C(=O)OR, covalently bonded to the parent molecule through a —C— linkage, where R is selected from alkyl, cycloalkyl, aryl, and heteroaryl (bonded through a ring carbon).

As used herein, the term "ether" refers to the group consisting of formula —CR'R"OR, covalently bonded to the parent molecule through a —C— linkage, where R is selected from alkyl, cycloalkyl, aryl, and heteroaryl (bonded through a ring carbon), and R' and R" are each independently selected from hydrogen, alkyl, and cycloalkyl.

As used herein, the term "alkyl" refers to a branched or unbranched fully saturated aliphatic hydrocarbon group. In some embodiments, alkyls may be substituted or unsubstituted. Alkyls include, but are not limited to, methyl, ethyl, propyl, isopropyl, butyl, isobutyl, tertiary butyl, pentyl, hexyl, cyclopropyl, cyclopentyl, cyclohexyl, cycloheptyl and the like, each of which may be optionally substituted in some embodiments. In some embodiments, the alkyl may have C1 to C6 carbon atoms. For example, $C_{1-6}$alkyl includes, but is not limited to, methyl, ethyl, propyl, isopropyl, butyl, isobutyl, sec-butyl, pentyl, 3-pentyl, hexyl, cyclopropyl, cyclobutyl cyclopentyl, cyclohexyl, and the like.

As used herein, the term "haloalkyl" refers to an alkyl group-, covalently bonded to the parent molecule through a —C— linkage, in which one or more of the hydrogen atoms are replaced by halogen. Such groups include, but are not limited to, chloromethyl, fluoromethyl, difluoromethyl, trifluoromethyl and 1-chloro-2-fluoromethyl, 2-fluoroisobutyl. A haloalkyl may be substituted or unsubstituted.

As used herein, the term "halo" or "halogen" refers to F (fluoro), Cl (chloro), Br (bromo) or I (iodo).

As used herein, the term "mercapto" refers to an alkyl radical covalently bonded to the parent molecule through an —S— linkage.

As used herein, the term "cycloalkyl" refers to saturated aliphatic ring system having three to twenty carbon atoms. A cycloalkyl refers to monocyclic and polycyclic saturated aliphatic ring system including, but not limited to, cyclopropyl, cyclopentyl, cyclohexyl, cycloheptyl, bicyclo[4.4.0]decanyl, bicyclo[2.2.1]heptanyl, adamantyl, norbornyl, and the like. In certain embodiments, a cycloalkyl comprises 3 to 20 carbon atoms (whenever it appears herein, a numerical range such as "3 to 20" refers to each integer in the given range; e.g., "3 to 20 carbon atoms" means that a cycloalkyl group may comprise only 3 carbon atoms, etc., up to and including 20 carbon atoms, although the term "cycloalkyl" also includes instances where no numerical range of carbon atoms is designated). A cycloalkyl may be designated as "$C_3$-$C_7$ cycloalkyl" or similar designations. By way of example only, "$C_3$-$C_6$ cycloalkyl" indicates a cycloalkyl having two, three, four, five or six carbon atoms, e.g., the cycloalkyl is selected from cyclopropyl, cyclobutyl, cyclopentyl, and cyclohexyl.

As used herein, the term "alkoxy" refers to an alkyl radical covalently bonded to the parent molecule through an —O— linkage. In some embodiments, alkoxys may be substituted or unsubstituted. Examples of alkoxy groups include, but are not limited to, methoxy, ethoxy, propoxy, isopropoxy, butoxy, n-butoxy, sec-butoxy, t-butoxy, cyclopropyloxy, cyclobutyloxy, cyclopentyloxy, cyclohexyloxy cycloheptyloxy, and the like. In some embodiments, the alkoxy may have C1 to C10 carbon atoms.

As used herein, the term "alkenyl" refers to a radical of from two to twenty carbon atoms containing at least one carbon-carbon double bond including, but not limited to, 1-propenyl, 2-propenyl, 2-methyl-1-propenyl, 1-butenyl, 2-butenyl, cyclopropenyl, cyclopentenyl, cyclohexenyl, cycloheptenyl and the like. In some embodiments, alkenyls may be substituted or unsubstituted. In some embodiments, the alkenyl may have C2 to C4 carbon atoms. As used herein, the term "alkynyl group" refers to a monovalent straight or branched chain radical of from two to twenty carbon atoms containing at least one carbon-carbon triple bond including, but not limited to, 1-propynyl, 1-butynyl, 2-butynyl, and the like. In some embodiments, alkynyls may be substituted or unsubstituted. In some embodiments, the alkynyl may have C2 to C4 carbon atoms.

As used herein, the term "aryl" refers to aromatic radical having one ring and optionally an appended ring, or multiple fused rings. Examples of aryl groups include, but are not limited to, phenyl, biphenyl, naphthyl, phenanthrenyl, naphthacenyl, and the like. In some embodiments, aryls may be substituted or unsubstituted. In some embodiments, the aryl can be a "heteroaryl" group.

As used herein, the term "heteroaryl" refers to an aromatic ring system radical in which one or more ring atoms are not carbon, namely heteroatom, having one ring or multiple fused rings. In fused ring systems, the one or more heteroatoms may be present in only one of the rings. Examples of heteroatoms include, but are not limited to, oxygen, sulfur and nitrogen. Examples of heteroaryl groups include, but are not limited to, furanyl, thieny, imidazolyl, quinazolinyl, quinolinyl, isoquinolinyl, quinoxalinyl, pyridinyl, pyrrolyl, oxazolyl, indolyl, and the like.

As used herein, the term "alkoxy" refers to straight or branched chain alkyl radical covalently bonded to the parent molecule through an —O— linkage. Examples of alkoxy groups include, but are not limited to, methoxy, ethoxy, propoxy, isopropoxy, butoxy, n-butoxy, sec-butoxy, t-butoxy and the like.

In some embodiments, the electrode current collector may be selected from the group consisting of a metal such as aluminum, copper, nickel, silver or stainless steel, and alloys thereof. In some embodiments, aluminum or an aluminum alloy may be used as the electrode current collector. In some embodiments, the electrode current collector may be generally formed to a thickness of 3 to 500 μm.

In some embodiments, the binder may include a secondary binder. In some embodiments, the secondary binder may be any material that improves properties of binding positive active material particles among one another and binding the positive active material with a current collector. Examples of the secondary binder include polyvinyl alcohol, carboxylmethyl cellulose, hydroxypropyl cellulose, polyvinyl chloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. In particular, polyvinylidene fluoride is preferably used as the secondary binder.

In some embodiments, the solvent may include a nonaqueous solvent or an aqueous solvent. Examples of the nonaqueous solvent may include N-methylpyrrolidone (NMP), dimethylformamide, dimethylacetamide, N,N-dimethylaminopropylamine, ethyleneoxide, tetrahydrofuran, and the like. The aqueous solvent may include water.

In some embodiments, the conductive agent may impart conductivity to an electrode. In some embodiments, the conductive agent may include any electrically conductive material, unless it causes a chemical change, and may be added in an amount of 1 to 30 wt % based on the total weight of the electrode slurry. Examples of the conductive material include a carbon-based material or carbon nanotube (CNT), such as natural graphite, artificial graphite, carbon black, acetylene black, ketchen black, a carbon fiber, and the like; a metal-based material such as a metal powder, a metal fiber, or the like that includes copper, nickel, aluminum, silver, and the like; a conductive polymer such as a polyphenylene derivative; or mixtures thereof.

In some embodiments, the negative electrode or the positive electrode may further include a filler or a viscosity modifier according to the necessity.

In some embodiments, the filler may be an auxiliary agent for suppressing expansion of the electrode and any fibrous material may be used, unless it causes a chemical change to the battery. Examples of the filler may include olefin-based polymers such as polyethylene or polypropylene, and fibrous materials such as a glass fiber, a carbon fiber or a metal fiber.

In some embodiments, the viscosity modifier serves to control the viscosity of the electrode slurry to facilitate mixing of the electrode slurry and coating of the slurry on the current collector, and may be added in an amount of 30 wt % or less based on the total weight of the electrode slurry. Examples of the viscosity modifier may include carboxymethylcellulose, polyvinylidene fluoride, but not limited thereto. In some embodiments, the solvent used in preparing the positive electrode slurry may also serve as the viscosity modifier.

Lithium Rechargeable Battery

Some embodiments provide a lithium rechargeable battery include a negative electrode, a positive electrode, a separator interposed between the negative electrode and the positive electrode, and an electrolyte.

The separator prevents a short circuit between the positive electrode and the negative electrode and provides a passageway of lithium ions. In some embodiments, a polyolefin-based polymer film, such as polypropylene, polyethylene, polyethylene/polypropylene, polyethylene/polypropylene/polyethylene, polypropylene/polyethylene/polypropylene, or a multilayered film thereof, a microporous film or nonwoven fabric may be used as the separator.

In some embodiments, a film formed by coating a highly stable resin on the microporous polyolefin film may also be used as the separator. When a solid electrolyte such as a polymer is used as the electrolyte, it may also serve as the separator.

In some embodiments, the electrolyte may include a lithium salt and a nonaqueous organic solvent, and may further include additives for improving charge and discharge characteristics or preventing overcharge.

The lithium salt plays a role of supplying lithium ions in a battery and operating a basic operation of the rechargeable lithium battery. The nonaqueous organic solvent serves as a medium that allows lithium ions participating in electrochemical reactions of the battery to move between positive and negative electrodes therein.

Non-limiting examples of the lithium salt include at least one salt selected from $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, LiC ($SO_2CF_3$)$_3$, $LiN(SO_3CF_3)_2$, $LiC_4F_9SO_3$, $LiAlO_4$, $LiAlCl_4$, LiCl and LiI. In some embodiments, the lithium salt may be used in a concentration ranging from about 0.6 M to about 2.0 M, preferably ranging from about 0.7 M to about 1.6 M. When the concentration of the lithium salt is less than 0.6 M, electrolyte conductivity may be lowered, resulting in deterioration of electrolyte performance. When the concentration of the lithium salt is greater than 2.0 M, electrolyte viscosity may increase, resulting in a reduction of lithium ion mobility.

In some embodiments, the nonaqueous organic solvent may include carbonates, esters, ethers or ketones, which may be used alone or in combination. Examples of the carbonates may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, examples of the esters may include γ-butyrolactone (GBL), n-methyl acetate, n-ethyl acetate, n-propyl acetate, and the like, and examples of the ethers may include dibutyl ether, and the like, but not limited thereto.

Among the nonaqueous organic solvents, the carbonate-based solvent may be prepared by mixing a cyclic carbonate and a chain carbonate. In some embodiments, the cyclic carbonate and the chain carbonate may be mixed together in a volume ratio ranging from about 1:1 to about 1:9. When the mixture is used in the range of the volume ratio, the electrolyte performance may preferably be enhanced.

In some embodiments, the non-aqueous organic electrolyte may be further prepared by mixing a carbonate-based solvent with an aromatic hydrocarbon-based solvent. Specific examples of the aromatic hydrocarbon-based organic solvent may include, but is not limited to, at least one selected from benzene, fluorobenzene, bromobenzene, chlorobenzene, cyclohexylbenzene, isopropylbenzene, n-butylbenzene, octylbenzene, toluene, xylene, mesitylene, and the like, which may be used alone or in combination.

In some embodiments, the carbonate solvent and the aromatic hydrocarbon-based organic solvent may be mixed together in a volume ratio ranging from about 1:1 to about 30:1 in the electrolyte including the carbonate solvent and the aromatic hydrocarbon-based organic solvent. Within this range, desired electrolyte performance may be demonstrated.

Hereinafter, the rechargeable battery including the electrode prepared according to an embodiment of the present disclosure will be described in detail.

FIG. 1 is a partially cross-sectional view of a lithium rechargeable battery according to an embodiment.

The following examples are provided for a better understanding of the present embodiments and technical details known in the related art are appropriately modified to be used as reference.

Referring to FIG. 1, the lithium rechargeable battery according to an embodiment includes a can 10, an electrode assembly 20, a cap assembly 30 and an electrolyte. The lithium rechargeable battery may be fabricated by accommodating the electrode assembly 20 and the electrolyte in the can 10 and sealing a top end of the can 10 by the cap assembly 30.

In some embodiments, the cap assembly 30 may include a cap plate 40, an insulation plate 50, a terminal plate 60 and an electrode terminal 80. In some embodiments, the cap assembly 30 may be coupled to an insulation case 70 to seal the can 10.

In some embodiments, the electrode terminal 80 may be inserted into a terminal hole 41 centrally formed in the cap plate 40. When the electrode terminal 80 is inserted into the terminal hole 41, a tubular gasket 46 is coupled to an outer surface of the electrode terminal 80 to then be inserted into the terminal hole 41. Therefore, the electrode terminal 80 is electrically insulated from the cap plate 40.

In some embodiments, the electrolyte may be injected into the can 10 through an electrolyte injection hole 42 after the cap assembly 30 is assembled to the top end of the can 10. In some embodiments, the electrolyte injection hole 42 may be closed by a separate plug 43. In some embodiments, the electrode terminal 80 may be connected to a negative electrode tab 17 of the negative electrode 23 or a positive electrode tab 16 of the positive electrode 21 to function as a negative electrode terminal or a positive electrode terminal.

In some embodiments, the rechargeable battery including the electrode prepared as disclosed and described herein may be fabricated in a cylindrical shape or a pouch shape as well as a prismatic shape illustrated herein.

The following examples illustrate the present embodiments in more detail. These examples, however, are not in any sense to be interpreted as limiting the scope of this disclosure.

PREPARATION EXAMPLE 1

To a 2 L reaction vessel equipped with a heater, a cooler and a stirrer were added deionized (DI) water (1,830 g), polyvinyl alcohol (132 g) and ammonium bicarbonate (0.3 g) to afford mixture A. The mixture was heated at 80° C. under a nitrogen atmosphere and maintained at this temperature for 2 hours. A 2.5 wt % mixture of methyl(meth)acrylate (MMA, 61 g), butylacrylate (BAM, 63.7 g) and methacrylic acid (MAA, 3.96 g) was added to a flask to afford mixture B. Mixture B was treated with a solution obtained by dissolving ammonium persulfate (0.02 g) in DI water (5 g) to afford mixture C. Thereafter, mixture A and a solution obtained by dissolving ammonium persulfate (0.35 g) in DI water (20 g) were simultaneously both added dropwise to mixture C over 2.5 hours. After completion of addition the reaction was maintained for 2 hours, the resultant product was cooled to 40° C. or less and packaged, yielding a binder having a weight average molecular weight of 320,000, a solid matter content of 11.0%, pH of 5.4, and viscosity of 1,100 cps.

PREPARATION EXAMPLE 2

To a 2 L reaction vessel equipped with a heater, a cooler and a stirrer were added DI water (1,830 g), polyvinyl alcohol (132 g) and ammonium bicarbonate (0.3 g) to afford mixture A. The mixture was heated at 80° C. under a nitrogen atmosphere and maintained at this temperature for 2 hours. A 2.5 wt % mixture of methyl(meth)acrylate (MMA, 61 g), butylacrylate (BAM, 63.7 g), methacrylic acid (MAA, 3.96 g) and N-methylol acrylamide (3.3 g) was added to a flask to afford mixture B. Mixture B was treated with a solution obtained by dissolving ammonium persulfate (0.02 g) in DI water (5 g) to afford mixture C. Thereafter, mixture A and a solution obtained by dissolving ammonium persulfate (0.35 g) in DI water (20 g) were simultaneously both added dropwise to mixture C over 2.5 hours. After completion of addition the reaction was maintained for 2 hours, the resultant product was cooled to 40° C. or less and packaged, yielding a binder having a weight average molecular weight of 330,000, a solid matter content of 11.0%, pH of 5.4, and a viscosity of 1,830 cps.

PREPARATION EXAMPLE 3

To a 2 L reaction vessel equipped with a heater, a cooler and a stirrer were added DI water (1,430 g), polyvinyl alcohol (132 g) and ammonium bicarbonate (0.3 g to afford mixture A. The mixture was heated at 80° under a nitrogen atmosphere and maintained at this temperature for 2 hours. A 2.5 wt % mixture of methyl(meth)acrylate (MMA, 61 g), butylacrylate (BAM, 63.7 g) and methacrylic acid (MAA, 3.96 g) was added to a flask to afford mixture B. Mixture B was treated with a solution obtained by dissolving ammonium persulfate (0.02 g of) in DI water (5 g) to afford mixture C. Thereafter, mixture A a solution obtained by dissolving ammonium persulfate (0.35 g) in DI water (20 g) and a mixture of dimethyldimethoxy silane (5.84 g), methyltrimethoxy silane (5.84 g) and 3-(meth)acryloxypropyl trimethoxy silane (1.31 g of) were all three simultaneously added dropwise to mixture C over 2.5 hours. After completion of addition the reaction was maintained for 2 hours, the resultant product was cooled to 40° C. or less and packaged, yielding a binder having a weight average molecular weight of 325,000, a solid matter content of 14.0%, pH of 5.1, and a viscosity of 3,700 cps.

PREPARATION EXAMPLE 4

To a 2 L reaction vessel equipped with a heater, a cooler and a stirrer were added DI water (1,830 g), polyvinyl alcohol (132 g) and ammonium bicarbonate (0.3 g to afford mixture A. The mixture was heated at 80° C. under a nitrogen atmosphere and maintained at this temperature for 2 hours. A 2.5 wt % mixture of styrene (94 g), butylacrylate (BAM, 27 g), methacrylic acid (MAA, 4 g) and N-methylol acrylamide (7 g) was added to a flask to afford mixture B. Mixture B was treated with a solution obtained by dissolving ammonium persulfate (0.02 g) in DI water (5 g) to afford mixture C. Thereafter, mixture A and a solution obtained by dissolving ammonium persulfate (0.35 g) in DI water (20 g) were both simultaneously added dropwise to mixture C over 2.5 hours. After completion of addition the reaction was maintained for 2 hours, the resultant product was cooled to 40° C. or less and packaged, yielding a binder having a weight average molecular weight of 380,000, a solid matter content of 11.0%, pH of 5.5, and a viscosity of 1,720 cps.

EXPERIMENTAL EXAMPLE 1

Measurement of Physical Properties

Various physical properties of the binders prepared in Preparation Examples 1 to 4 were analyzed using the following measuring devices and the measurement results are listed in Table 1.
Molecular weight: GPC (Gel Permeation Chromatography) (LC-10A instrument manufactured by Shimadzu, Japan).
Glass transition temperature: DSC (Differential Scanning calorimetry) (Q 10 thermal analysis (TA) instrument.

TABLE 1

|  | Molecular weight | | Glass transition temperature | Functional monomer | |
| --- | --- | --- | --- | --- | --- |
|  | Mn | Mw | (Tg) (° C.) | type | wt % |
| Preparation Example 1 | 255,000 | 320,000 | 12.50, 79.30 | — | — |
| Preparation Example 2 | 270,000 | 330,000 | 12.74, 78.92 | N-MOA | 2.5 |
| Preparation Example 3 | 221,000 | 325,000 | 10.32, 80.16 | Silane | 9.2 |
| Preparation Example 4 | 275,000 | 380,000 | 69.08 | N-MOA | 5.3 |

COMPARATIVE EXAMPLE 1

80 g of graphite as a negative electrode active material, 5 g of SBR (Styrene butadiene Rubber) and 5 g of CMC (carboxymethylcellose) as a binder, and 10 g of denka black as a conductive agent were dispersed in water as a solvent to have a solid matter content of about 45%, thereby preparing a negative electrode slurry.
The negative electrode slurry was coated on a copper (Cu) foil and then dried to have a thickness of 111 μm, and compressed to prepare a 56 μm thick negative electrode.
The prepared negative electrode was cut in a shape of a coin having a diameter of 16 mm. A lithium rechargeable battery was manufactured using the negative electrode, a polypropylene separator, lithium metal as a counter electrode and an electrolyte prepared by dissolving 1.5 mol/L of $LiPF_6$ in a mixture of ethylene carbonate (EC), fluoroethylene carbonate (FEC) and diethyl carbonate (DEC) in a volume ratio of 5:75:20.

COMPARATIVE EXAMPLE 2

As negative electrode active materials, 4 g of silicon oxide ($SiO_x$) (x=1) and 76 g of a mixture containing graphite (MC08 manufactured by Mitsubishi Chemical, Japan) and graphite (SD 13 manufactured by Showa Denko, Japan) mixed in a weight ratio of 1:1; 5 g of SBR (Styrene butadiene Rubber) and 5 g of CMC (carboxymethylcellose) as a binder; and 10 g of denka black as a conductive agent were dispersed in water as a solvent to have a solid matter content of about 45%, thereby preparing a negative electrode slurry.
The negative electrode slurry was coated on a copper (Cu) foil and then dried to have a thickness of 111 μm, and compressed to prepare a 56 μm thick negative electrode.
The prepared negative electrode was cut in a shape of a coin having a diameter of 16 mm. A lithium rechargeable battery was manufactured using the negative electrode, a polypropylene separator, lithium metal as a counter electrode and an electrolyte prepared by dissolving 1.5 mol/L of $LiPF_6$ in a mixture of ethylene carbonate (EC), fluoroethylene carbonate (FEC) and diethyl carbonate (DEC) in a volume ratio of 5:75:20.

COMPARATIVE EXAMPLE 3

A lithium rechargeable battery was manufactured in substantially the same manner as in Comparative Example 1, except that 8 g of silicon oxide ($SiO_x$) (x=1) and 72 g of a mixture containing graphite (MC08 manufactured by Mitsubishi Chemical, Japan) and graphite (SD 13 manufactured by Showa Denko, Japan) in a weight ratio of 1:1 were used as negative electrode active materials; that 5 g of SBR (Styrene butadiene Rubber) and 5 g of CMC (carboxymethylcellose) were used as binders; and that 10 g of denka black was used as a conductive agent.

COMPARATIVE EXAMPLE 4

A lithium rechargeable battery was manufactured in substantially the same manner as in Comparative Example 1, except that 16 g of silicon oxide (SiO$_x$) (x=1) and 64 g of a mixture containing graphite (MC08 manufactured by Mitsubishi Chemical, Japan) and graphite (SD 13 manufactured by Showa Denko, Japan) in a weight ratio of 1:1 were used as negative electrode active materials, and 10% PAI (Polyamide Imide) having a nonaqueous solvent NMP was used as a binder, and the resultant product was dried at 100° C., followed by performing heat treatment at 350° C. for 2 hours.

EXAMPLE 1

A lithium rechargeable battery was manufactured in substantially the same manner as in Comparative Example 1, except that 10 g of the polymer of Chemical Formula 4 prepared in Preparation Example 3 was used as a binder:

Chemical Formula 4

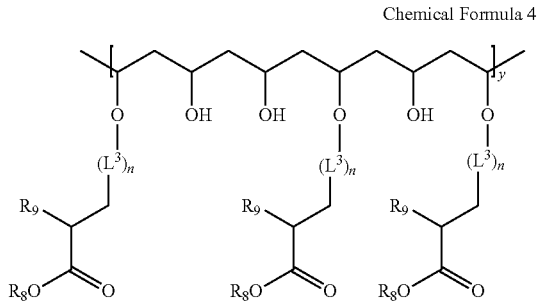

wherein L$^3$ may be

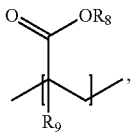

wherein R$_8$ is H, CH$_3$, CH$_3$(CH$_2$)$_3$ or C$_3$H$_6$Si(OCH$_3$)$_3$ used in a ratio of 3.1:46.9:49.0:1.0, and R$_9$ is H or CH$_3$ used in a ratio of 49:51.

EXAMPLE 2

A lithium rechargeable battery was manufactured in substantially the same manner as in Comparative Example 2, except that 10 g of a polymer of Chemical Formula 4 was used as a binder.

EXAMPLE 3

A lithium rechargeable battery was manufactured in substantially the same manner as in Comparative Example 1, except that 12 g of silicon oxide (SiO$_x$) (x=1) and 68 g of a mixture containing MC08 graphite and SD 13 graphite mixed in a weight ratio of 1:1 were used as negative electrode active materials and the polymer of Chemical Formula 4 was used as a binder.

EXAMPLE 4

A lithium rechargeable battery was manufactured in substantially the same manner as in Comparative Example 1, except that 16 g of silicon oxide (SiO$_x$) (x=1) and 64 g of a mixture containing MC08 graphite and SD 13 graphite mixed in a weight ratio of 1:1 were used as negative electrode active materials and the polymer of Chemical Formula 4 was used as a binder.

EXPERIMENTAL EXAMPLE 1

Capacity Characteristics

The lithium rechargeable batteries manufactured in Comparative Examples and Examples were charged and discharged under a constant current of 0.1 C to then measure the discharge capacity of each battery, and the measurement results are shown in Table 2. In measuring the capacity, the cut-off voltage was set to 1.5 V-0.01 V.

EXPERIMENTAL EXAMPLE 2

Retention Characteristics

Each of the lithium rechargeable batteries manufactured in Comparative Examples and Examples was subjected to 50 cycle capacity tests under a constant current of 1 C. The capacity retention (%) at a 50th cycle relative to initial cycle capacity was measured and the results thereof are shown in Table 2.

EXPERIMENTAL EXAMPLE 3

Initial Efficiency

Charge and discharge capacities of each of the lithium rechargeable batteries manufactured in Comparative Examples and Examples were measured after repeated charge and discharge cycles under a constant current of 0.1 C. The discharge capacity (%) relative to the charge capacity was measured as an initial capacity and the results thereof are shown in Table 2.

EXPERIMENTAL EXAMPLE 4

Adhesion

In order to evaluate adhesion properties of the negative electrodes of the lithium rechargeable batteries manufactured in Comparative Examples and Examples, a peeling-off test was performed such that each 10×25 mm sample was fixed to a glass plate and an end of the negative electrode was attached to a jig to then be lifted 15 mm at a speed of 100 mm/min, and the results thereof are shown in Table 2.

TABLE 2

| | Discharge capacity (mAh/g) | Retention (%) @50 | Initial efficiency (%) | Adhesion (gf/mm) |
|---|---|---|---|---|
| Comparative Example 4 | 458 | 84@50 | 73 | 8 |
| Example 1 | 355 | 96@50 | 84 | 9.2 |
| Example 2 | 420 | 94@50 | 85 | 8.5 |
| Example 3 | 466 | 92@50 | 83 | 7.9 |
| Example 4 | 534 | 95@50 | 85 | 7.3 |

As shown in Table 2, in each of Examples 1 to 4 in which a binder of one or more embodiments of the present disclosure was used, the negative electrode active material had very high adhesion. In addition, the lithium rechargeable battery prepared in Example 4 in which the amount of the Si-based active material was increased 2 to 4 times demonstrated a much better cycle life characteristic than in Comparative Example 4 in which PAI was used.

While the present embodiments have been described in connection with what is presently considered to be practical exemplary embodiments, it is to be understood that various modifications and equivalent arrangements may be made without departing from the spirit or scope of the present disclosure as set forth in the following claims.

What is claimed is:

1. A binder for an electrode of a lithium rechargeable battery, comprising a copolymer of Chemical Formula 1:

Chemical Formula 1

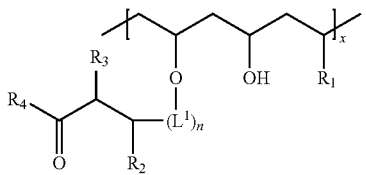

wherein $L^1$ is

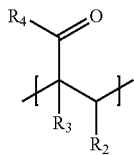, wherein each $R_1$ is independently OH or $-OR_5$,
wherein each $R_2$ is independently selected from H (hydrogen), a substituted or unsubstituted $C_1$-$C_{10}$ alkyl group, a substituted or unsubstituted styrene group, $-(C(R_6)_2)_q OSi(R_6)_2 OR_6$, $-(C(R_6)_2)_q OSi(R_6)_3$, $-(C(R_6)_2)_q OSi(OR_6)_3$, $-(C(R_6)_2)_{,q} SiR_6(OR_6)_2$, $-(C(R_6)_2)_{,q} Si(R_6)_2 OR_6$, $-(C(R_6)_2)_q Si(R_6)_3$ and $-(C(R_6)_2)(_q Si(OR_6)_3$,
wherein each $R_3$ is a compound of Chemical Formula 3:

$$-SiR_7R_7-[-O-SiR_7R_7-]_p-R_7$$  Chemical Formula 3 wherein at least one of $R_2$ and $R_3$ is not H (hydrogen);
wherein each $R_4$ is $OR_{10}$;
wherein $R_5$ is $-(CHR_2 CR_3 COR_4)_m (CHR_2 CHR_3 COR_4)$;
wherein each $R_6$ is independently selected from H (hydrogen) or a substituted or unsubstituted $C_1$-$C_{20}$ alkyl group, a $C_2$-$C_{20}$ alkenyl group, a $C_2$-$C_{20}$ alkynyl group, a $C_1$-$C_{16}$ alkyl group, a $C_6$-$C_{20}$ aryl group, and a $C_3$-$C_8$ cycloalkyl group;
wherein each $R_7$ is independently selected from H (hydrogen), OH, a substituted or unsubstituted $C_1$-$C_{20}$ alkyl group, a $C_2$-$C_{20}$ alkenyl group, a $C_2$-$C_{20}$ alkynyl group, a $C_6$-$C_{20}$ aryl group, and a $C_3$-$C_8$ cycloalkyl group, each optionally substituted with one or more components selected from the group consisting of halogen, amino, mercapto, ether, ester, $C_1$-$C_{20}$ alkoxy, sulfone, nitro, hydroxy, cyclobutene, carbonyl, carboxyl, alkyd, urethane, vinyl, nitrile, and epoxy;
wherein each $R_{10}$ is a compound of Chemical Formula 3 as defined above;
wherein each $R_{11}$ and $R_{12}$ is independently H (hydrogen), a substituted or unsubstituted $C_1$-$C_{10}$ straight or branched alkyl group, a substituted or unsubstituted $C_2$-$C_{20}$ alkenyl group, or a substituted or unsubstituted $C_3$-$C_8$ cycloalkyl group;
wherein x is an integer between 1 and 5,000,
wherein each m is an integer between 500 and 5,000,
wherein each n is an integer between 500 and 5,000;
wherein each p is an integer between 500 and 5,000;
wherein each q is 0, 1, 2, 3, 4, 5, or 6; and
wherein $R_5$ is from 30 to 70 wt % of the molecular mass of the copolymer of Chemical Formula 1.

2. The binder of claim 1, wherein the binder of Chemical Formula 1 has an average molecular weight of 200,000 to 500,000.

3. The binder of claim 1, wherein in the copolymer of Chemical Formula 1, n and x are contained in a ratio of 1:2.3 to 2.3:1.

4. The binder of claim 1, wherein the binder is made by a process comprising:
grafting monomer to polyvinyl alcohol, wherein the monomer is an acryl monomer and a carboxylic monomer,
where the acryl monomer is at least one selected from the group consisting of N-methylol acrylamide, methyl (meth)acrylate, butyl(meth)acrylate, ethyl acrylate,2-ethyl hexyl acrylate, hydroxypropyl(meth)acrylate, styrene, alpha-methyl styrene and (meth)acrylonitrile; and
where the carboxylic monomer is at least one selected from the group consisting of (meth)acrylic acid, itaconic acid, fumaric acid, crotonic acid, maleic acid, monomethyl itaconate, methyl fumarate and monobutyl fumarate, which are used alone or in a combination of two or more of these materials.

5. The binder of claim 4, wherein the acryl monomer is contained in an amount of 70 to 98 wt% based on the total weight of the monomers used.

6. The binder of claim 4, wherein the grafted acryl group has a glass transition temperature (Tg) in a range of 0 to 70° C.

7. The binder of claim 4, further comprising a silane grafted binder.

8. The binder of claim 1, further comprising a copolymer of Chemical Formula 2:

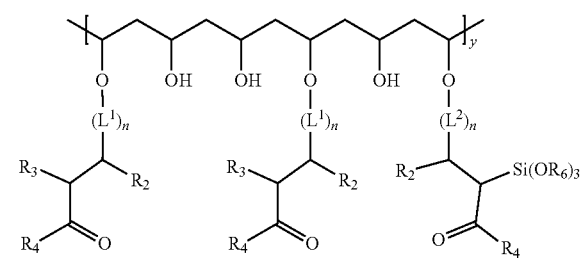

wherein $L^1$ is

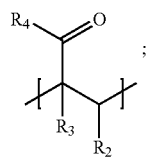;

wherein $L^2$ is

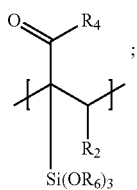

y is an integer from 1 to about 5000; and wherein $R_2$ and $R_3$ are each independently H (hydrogen), a substituted or unsubstituted $C_1$-$C_{10}$ alkyl group, or a substituted or unsubstituted styrene group, provided at least one of $R_2$ and $R_3$ is not H (hydrogen), and $R_4$ is H (hydrogen), a substituted or unsubstituted $C_1$-$C_{10}$ linear or branched alkyl group, a substituted or unsubstituted $C_2$-$C_{20}$ alkenyl group, or a substituted or unsubstituted $C_3$-$C_8$ cycloalkyl group.

9. The binder of claim 1, wherein each $R_7$ is independently $C_1$-$C_{20}$ alkyl group, a $C_2$-$C_{20}$ alkenyl group, a $C_2$-$C_{20}$ alkynyl group, a $C_6$-$C_{20}$ aryl group, or a $C_3$-$C_8$ cycloalkyl group, each optionally substituted with one or more components selected from the group consisting of halogen, amino, mercapto, ether, ester, $C_1$-$C_{20}$ alkoxy, sulfone, nitro, hydroxy, cyclobutene, carboxyl, alkyd, urethane, vinyl, and nitrile.

10. An active material for an electrode of a rechargeable battery, comprising:
    an electrode active material;
    the binder of claim 1; and
    a solvent.

11. An electrode for a rechargeable battery using the electrode active material of claim 10.

12. A rechargeable battery comprising:
    a positive electrode;
    a negative electrode; and
    an electrolyte,
    wherein one of the positive electrode and the negative electrode is the electrode of claim 11.

13. The rechargeable battery of claim 12, wherein the electrode is a negative electrode.

* * * * *